United States Patent
Childers et al.

(10) Patent No.: US 9,267,821 B2
(45) Date of Patent: Feb. 23, 2016

(54) COMBINED SWEPT-CARRIER AND SWEPT-MODULATION FREQUENCY OPTICAL FREQUENCY DOMAIN REFLECTOMETRY

(75) Inventors: Brooks A. Childers, Christiansburg, VA (US); Robert M. Harman, Troutville, VA (US); Roger G. Duncan, Christiansburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 1391 days.

(21) Appl. No.: 12/695,613

(22) Filed: Jan. 28, 2010

(65) Prior Publication Data
US 2011/0181871 A1 Jul. 28, 2011

(51) Int. Cl.
G01N 21/55 (2014.01)
G01D 5/353 (2006.01)
G01M 11/00 (2006.01)

(52) U.S. Cl.
CPC ........ G01D 5/35316 (2013.01); G01D 5/35387 (2013.01); G01M 11/3172 (2013.01)

(58) Field of Classification Search
CPC .......... G01D 5/35316; G01D 5/35387; G01D 5/35303; G01D 5/35383; G01D 5/35354; G01D 5/35377; G01D 5/353; G01D 5/35312; G01M 11/3172; G01M 11/083; G01M 11/3181; G01L 1/246; G01L 11/025; G01K 11/3206
USPC .................. 356/73.1, 477; 398/9–38; 385/12
See application file for complete search history.

(56) References Cited

U.S. PATENT DOCUMENTS

| 7,006,676 | B1* | 2/2006 | Zeylikovich et al. | 382/131 |
| 7,302,123 | B2* | 11/2007 | Jones | 385/12 |
| 7,639,902 | B2* | 12/2009 | Paolella | 385/13 |
| 2002/0161539 | A1 | 10/2002 | Jones et al. | |
| 2004/0044489 | A1 | 3/2004 | Jones et al. | |
| 2004/0208523 | A1 | 10/2004 | Carrick et al. | |
| 2006/0203859 | A1* | 9/2006 | Cable et al. | 372/20 |
| 2009/0103072 | A1* | 4/2009 | Fromme | 356/3 |
| 2010/0014071 | A1 | 1/2010 | Hartog | |

FOREIGN PATENT DOCUMENTS

| CA | 2001368 A1 | 4/1990 |
| EP | 0250354 A2 | 12/1987 |

OTHER PUBLICATIONS

H. Ghafoori-Shiraz, et al. "Optical-fiber diagnosis using optical-frequency-domain reflectometry". Optics Letters. vol. 10., No. 3, Mar. 1985. pp. 160-162.
Emir Karamehmedovic, et al. "Fibre-Optic Distributed Temperature Sensing Using IOFDR". Proceedings of SPIE. vol. 5502. pp. 200-203. (Jun. 2004).
Notification of Transmittal of the International Search Report and the Written Opinion of the International Searching Authority, or the Declaration; PCT/US2011/022517; Nov. 30, 2011.

* cited by examiner

*Primary Examiner* — Tarifur Chowdhury
*Assistant Examiner* — Mohamed K Amara
(74) *Attorney, Agent, or Firm* — Cantor Colburn LLP

(57) ABSTRACT

An apparatus for estimating a parameter, the apparatus includes: an optical fiber; a component in communication with the optical fiber and configured to interact with light at a wavelength related to the parameter; and an optical interrogator in communication with the optical fiber and configured to: illuminate the optical fiber with a series of light inputs, each light input in the series having a substantially constant unique optical wavelength and swept-frequency amplitude modulation; and receive a resulting light signal associated with each light input in the series; wherein the resulting light signals associated with the series of light inputs are used to estimate the parameter.

22 Claims, 5 Drawing Sheets

FIG. 1A
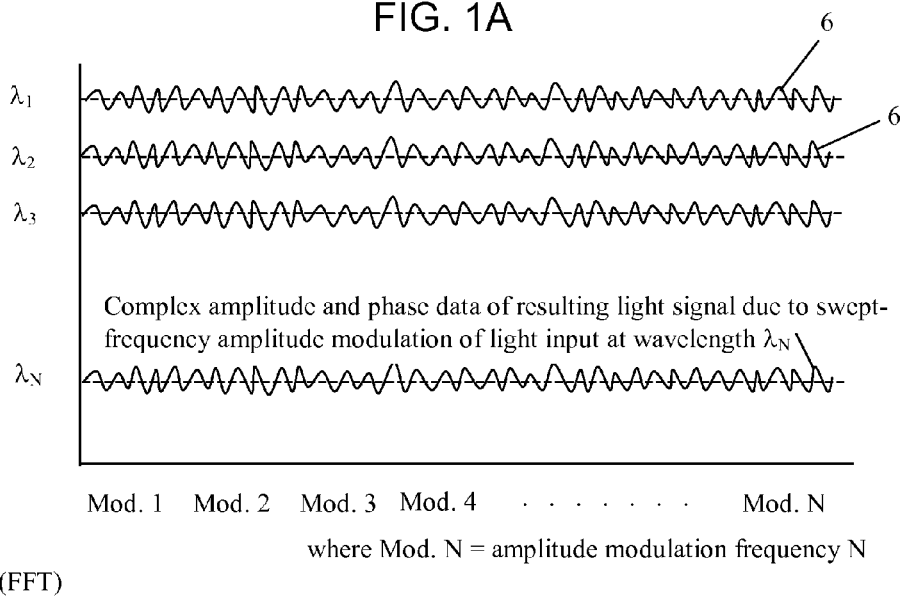
Mod. 1   Mod. 2   Mod. 3   Mod. 4   · · · · · · ·   Mod. N
where Mod. N = amplitude modulation frequency N
Transform (FFT)
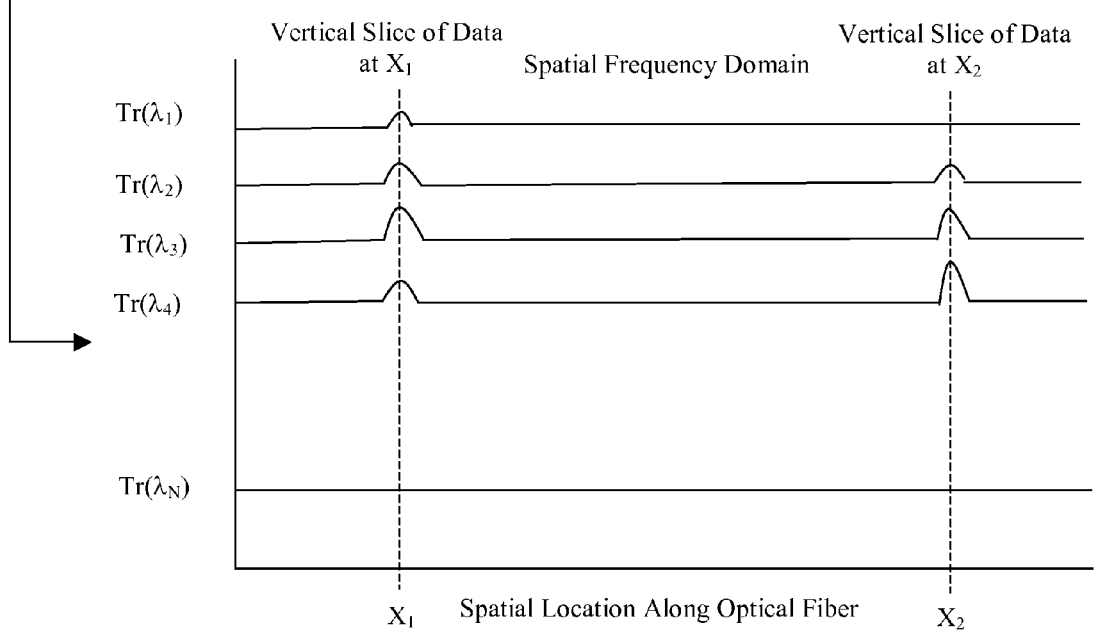
where $Tr(\lambda_N)$ = transform of resulting light signal due to light input at wavelength $\lambda_N$
FIG. 1B

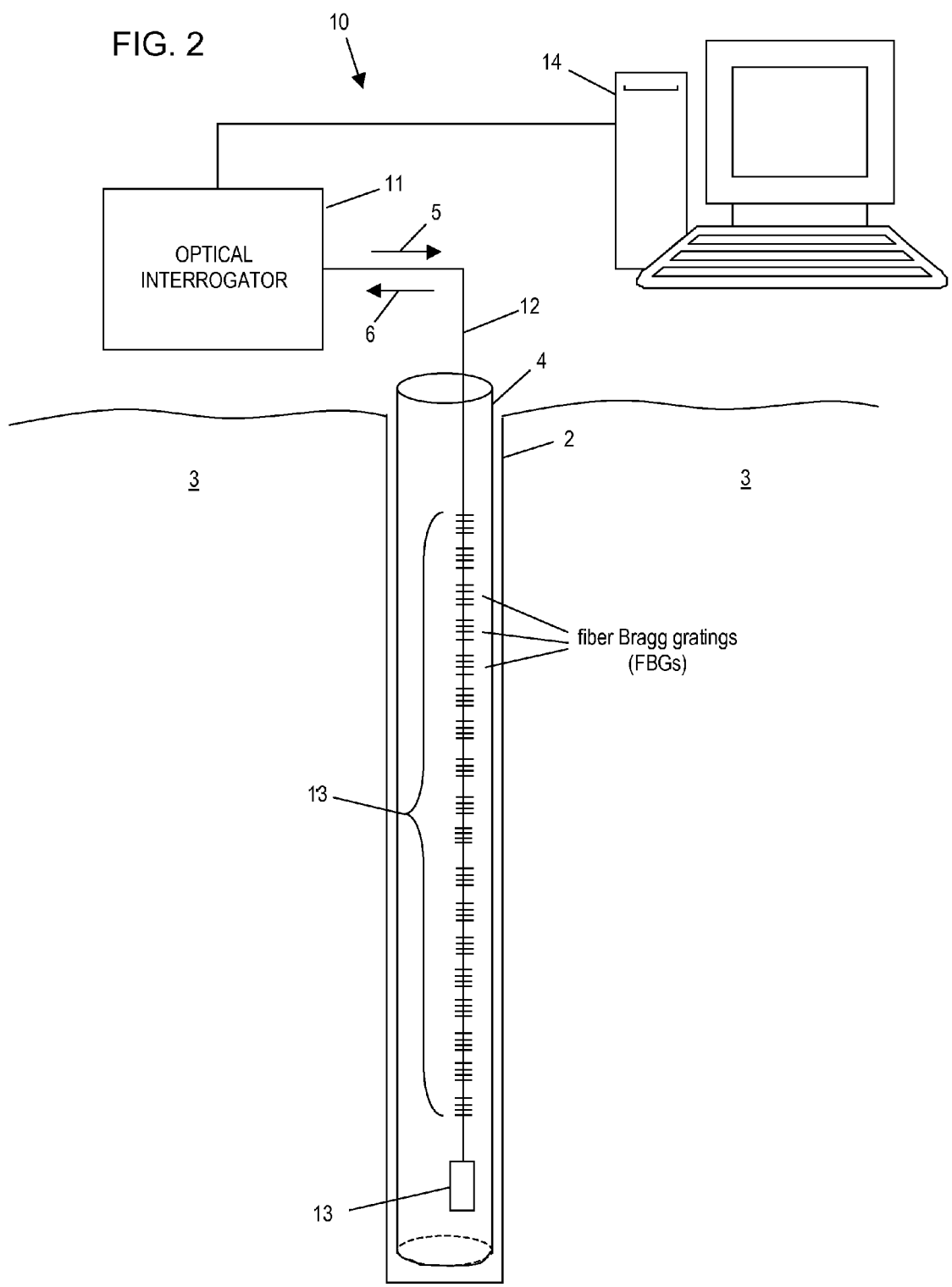

COMBINED SWEPT-CARRIER AND SWEPT-MODULATION FREQUENCY OPTICAL FREQUENCY DOMAIN REFLECTOMETRY

BACKGROUND OF THE INVENTION

1. Field of the Invention

The present invention relates to interrogating an optical fiber to obtain information about the fiber or devices in communication with the fiber. More particularly, the interrogating is performed using optical reflectometry in a borehole penetrating the earth.

2. Description of the Related Art

In exploration and production of hydrocarbons, it is often necessary to drill a borehole into the earth to gain access to the hydrocarbons. Equipment and structures, such as borehole casings for example, are generally disposed into a borehole as part of the exploration and production. Unfortunately, the environment presented deep into the borehole can place extreme demands upon the equipment and structures disposed therein. For example, the equipment and structures can be exposed to high temperatures, pressures, and vibrations that can effect their operation and longevity.

In order to monitor the health of the equipment and structures disposed downhole, a fiber-optic distributed sensing system (DSS) may be used. Sensing fiber (an optical fiber containing sensors or in itself functioning as a sensor) or sensors may be attached to the equipment and structures at various locations usually at different depths in the borehole. The sensors can measure temperature, pressure, strain, and other parameters. By measuring strain for example, the system can determine if borehole casing is being deformed.

In one type of DSS, swept-wavelength (of light) interferometry can be used to interrogate a series of fiber Bragg gratings. Each fiber Bragg grating (FBG) in the series acts as a sensor. The optical fiber, in one example, is affixed to casing or wrapped along a length of the casing. As each FBG is exposed to a changing condition, the optical characteristics of each FBG will change in relation to the changed condition. A sensor interrogator is used to measure the optical characteristics of each of the FBGs in order to ascertain the changing conditions.

With conventional swept-wavelength Optical Frequency Domain Reflectometry (OFDR), also referred to as coherent OFDR, a swept-wavelength light source is coupled to an optical fiber. The optical fiber includes a reference reflector and a series of FBGs. The wavelength of light from the light source is swept to interrogate each of the FBGs. The reference reflector forms an interferometric cavity, such as a Fabry-Perot cavity, with each individual FBG.

As the wavelength of light from the light source is swept, an interferogram is created with a frequency for each interferometric cavity that is proportional to the length of the cavity for each FBG. Thus, spectral data from each FBG is modulated with a unique frequency, which ultimately permits individual inspection of the FBGs through conventional signal processing techniques. Converting the spectral data into the spatial frequency domain through a Fast Fourier Transform yields a view of the fiber with one set of measurements that includes the amplitude of the reflected light as a function of distance, where the distance is derived from the time. In this manner, each FBG can be monitored and treated as an individual sensor.

Unfortunately, the same vibration that can adversely affect the equipment disposed in a borehole can also adversely affect the conventional coherent OFDR system. The vibrations can affect light signals in the optical fiber, thereby, limiting the usable length of the optical fiber. The longer fiber lengths especially provide more opportunity for light interaction with the vibration, resulting generally, in increased distortion with longer lengths.

The conventional coherent OFDR system can also have problems relating to nonlinear tuning of the wavelengths of light transmitted into the fiber. These nonlinearities can reduce the fidelity of the measurements.

Therefore, what are needed are techniques to interrogate an optical fiber that reduce susceptibility to vibration of the optical fiber or to the tuning rate nonlinearities of the light used for the interrogation.

BRIEF SUMMARY OF THE INVENTION

Disclosed is an apparatus for estimating a parameter. The apparatus includes: an optical fiber; a component in communication with the optical fiber and configured to interact with light at a wavelength related to the parameter; and an optical interrogator in communication with the optical fiber and configured to: illuminate the optical fiber with a series of light inputs, each light input in the series having a substantially constant unique optical wavelength and swept-frequency amplitude modulation; and receive a resulting light signal associated with each light input in the series; wherein the resulting light signals associated with the series of light inputs are used to estimate the parameter.

Also disclosed is a method for estimating a parameter. The method includes: illuminating an optical fiber with a series of light inputs using an optical interrogator, each light input in the series having a substantially constant unique wavelength and swept-frequency amplitude modulation; receiving a resulting light signal associated with each light input in the series using the optical interrogator; estimating the parameter from the resulting light signals associated with the series of light inputs; wherein a component is in communication with the optical fiber and configured to interact with light at a wavelength related to the parameter.

Further disclosed is a computer-readable medium having computer-executable instructions for estimating a parameter by implementing a method including: illuminating an optical fiber with a series of light inputs, each light input in the series having a substantially constant unique wavelength and swept-frequency amplitude modulation, wherein the optical fiber is in communication with a component configured to interact with light at a wavelength related to the parameter; receiving a resultant light signal associated with each light input in the series; and estimating the parameter from the resultant light signals associated with the series of light inputs.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

FIGS. 1A-1D, collectively referred to as FIG. 1, illustrate graphs depicting aspects to the techniques disclosed herein;

FIG. 2 illustrates an exemplary embodiment of an optical system having an optical fiber disposed in a borehole penetrating the earth;

DETAILED DESCRIPTION OF THE INVENTION

Figure 1C:
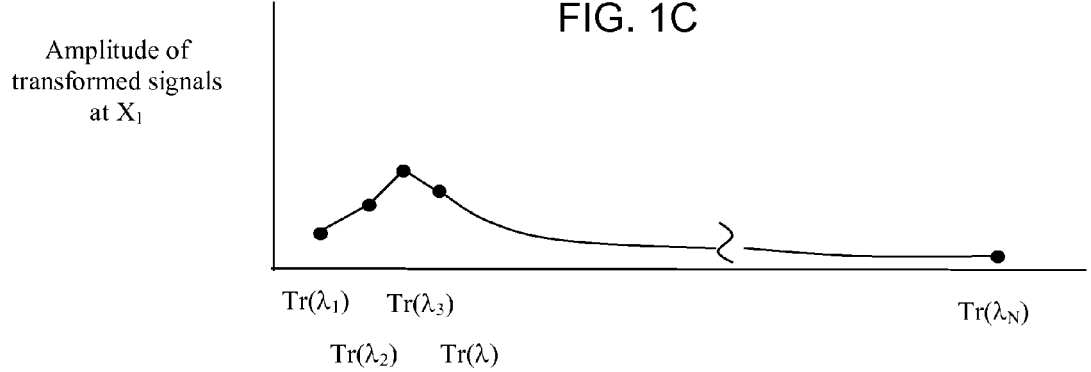

Disclosed are exemplary embodiments of techniques for interrogating an optical fiber. The techniques are not as susceptible to operational problems due to vibration of the optical fiber or to nonlinearities of a light source sweeping through optical wavelengths as in conventional Optical Frequency Domain Reflectometry (OFDR) systems.

The optical fiber can include several types of components that can be read by the techniques disclosed herein. In general, each of the components is configured to reflect light with a pattern of wavelengths (or optical frequencies) related to a value of the parameter being measured. For example, each of the components can reflect light by creating an interferometer either by itself or in combination with a reference reflector. As the spacing of the reflecting surfaces of the interferometer changes due to a change in a parameter being sensed, the wavelength of the reflected light will also change in relation to the parameter being sensed. The sensed parameter is thus encoded interferometrically. Non-limiting embodiments of the interferometer include a Mach-Zehnder interferometer and a Michelson interferometer.

The term "read" as used herein relates to obtaining a measurement or information from each individual component or fiber segment by interpreting aspects of the light received therefrom, such as its magnitude, wavelength, or phase. Non-limiting examples of the components include distributed sensors such as fiber Bragg gratings (FBGs), interface components and mechanisms such as splices and connectors, the intrinsic Rayleigh scatter of the fiber, and individual sensors within or in communication with the optical fiber at any location along the optical fiber. Intrinsic Rayleigh backscatter can occur throughout an optical fiber or from one or more segments of the optical fiber. Thus, a continuous fiber itself or a segment(s) can act as a sensor using the Rayleigh backscatter to communicate a value measured by the sensor. Accordingly, the term "component" includes the optical fiber itself or one or more segments of the optical fiber. A component can also include a defect in the optical fiber. Regarding a connector, readings of the connector can be monitored to determine if the connector has undergone any change or degradation. Similarly, the introduction of a previously absent reflection can signify the formation of a defect within the optical fiber, or some component therein, or an alteration in the state of the optical fiber.

The techniques, which include apparatus and method, call for illuminating the optical fiber with a continuous wave of input light at a substantially constant first wavelength (or optical frequency) with the amplitude of the continuous wave being modulated. One non-limiting example of the modulation is the amplitude being a sine wave at a radio frequency (RF). The frequency of the amplitude modulation is then swept (i.e., changed) and resulting signals from the optical fiber are received. Thus, the input light and the resulting signals are formed from wave inputs and, thus, can be considered to be in an optical frequency domain. In general, the amplitude and phase of the resultant signals are measured as a function of the modulation frequency.

The resultant signals can be the Rayleigh scattering, as discussed above, Raman scattering, and/or Brillouin scattering. In one embodiment, the resultant signal includes reflections received at the same end of the optical fiber that was used to transmit the input light into the optical fiber. In another embodiment, the resultant signal is received at a distal end of the optical fiber (i.e., the end opposite from which the input light was transmitted into the optical fiber).

One non-limiting example of changing the modulation frequency is a step-wise change. Hence, the received light (i.e., signals) can be considered to be in response to a step input. The difference between frequency-steps for step-wise changes can be constant or varied. The resolution of the measurements of the components can be increased by decreasing the difference between the frequency-steps. The difference between the frequency-steps can be selected manually or automatically. In one embodiment, the difference is constant and predetermined. In another embodiment, the difference can be automatically selected during the measurement process such that a coarse scan can be performed and then followed up with a finer resolution scan if, for example, some aspect of the measurement is perceived to have changed.

The received light reflected by the optical fiber is inversely transformed using a mathematical algorithm Fast Fourier Transform (FFT) into a spatial frequency domain having units of time. In one embodiment, the algorithm is a Fast Fourier Transform (FFT). Other algorithms may also be used. In the spatial frequency domain, the time is related to the spatial location along the optical fiber of the segment of interest or component of interest being illuminated by the input light. The amplitude of the resultant light (e.g., reflected light) at one spatial time is related to the information being transmitted by the component at the spatial location associated with that one spatial time. A first set of readings or measurements is formed from the reflections (or resulting signals) of the input light at the constant first optical wavelength.

Not all components may be read using the constant first wavelength because some components may reflect (or transmit) light only partially or not at all at the optical frequency or band of optical frequencies associated with the modulation of the first optical frequency. Hence, the optical frequency of the input light is changed to a substantially constant second wavelength with the amplitude also being modulated with a swept frequency. In one embodiment, the amplitude of the input light at the second wavelength is modulated similar to the modulation of the input light at the first frequency. Using the input light at the second wavelength, reflected light is received and transformed using the FFT into the spatial frequency domain where the measurement or information from each component or fiber segment is associated with a spatial location. A second set of readings is formed from the reflections of the input light at the constant second frequency.

After the second set of readings is performed, a third set of readings is performed with the input light at a third substantially constant wavelength with swept-frequency amplitude modulation. Similarly, fourth, fifth, sixth, etc. sets of readings can be performed at fourth, fifth, sixth, etc. constant or semi-constant wavelengths, respectively, each with swept-frequency amplitude modulation. Thus, multiple sets of readings are obtained by illuminating the optical fiber 12 with a series of light inputs where each light input in the series has a substantially constant unique wavelength and swept-frequency amplitude modulation and receiving reflections of light (or light signals) associated with each light input in the series. The multiple sets of readings are then assembled into one composite set of readings, which provides a complex data set containing, among other parameters, amplitude of reflection (or transmission) and spatial location data for each of the components in optical communication with the optical fiber.

The selected number of sets of readings at different constant wavelengths depends on a number factors such as the length of the optical fiber, the number of optical components in communication with the optical fiber, a desired resolution of the reading, and a dynamic range associated with measurements or information obtained from each of the optical components. In general, the resolution of the readings will increase by decreasing the difference between the constant wavelengths of the light inputs. Similarly, the resolution of the readings will also increase by decreasing the difference between the frequency-steps in the swept frequency modulation.

Reference may now be had to FIG. 1, which illustrates one example of the techniques disclosed herein. FIG. 1A depicts aspects of resultant light signals 6 due to the illumination of the optical fiber. Each resultant light signal 6 is associated with a light input having a unique optical wavelength $\lambda_N$. Each of the resultant light signals 6 includes complex amplitude and phase data. $Mod_1$ through $Mod_N$ represents frequencies through which the amplitude modulation of the light input of wavelength $\lambda_N$ is swept.

Figure 1D:
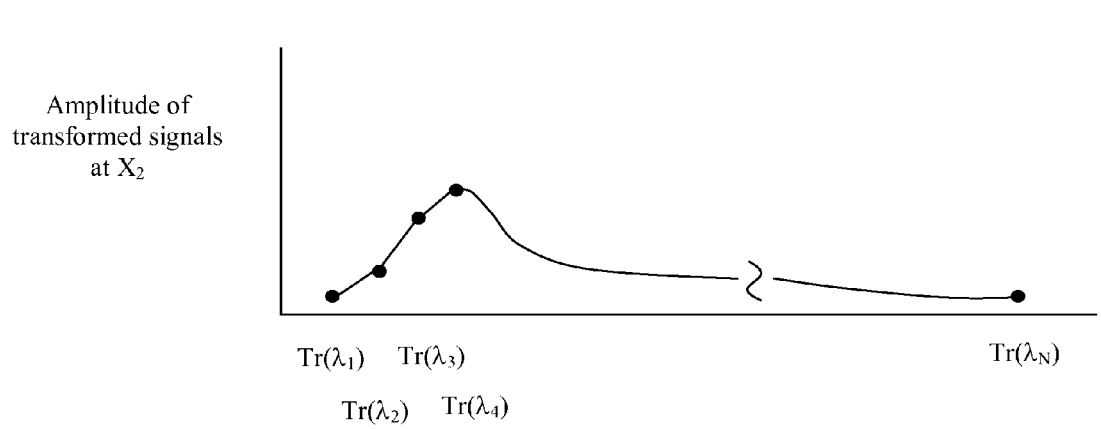

FIG. 1B depicts aspects of the transformation of the resulting light signals 6 into the spatial frequency domain. In the spatial frequency domain, each resultant light signal 6 includes a magnitude at a position $X_N$ along the optical fiber. Vertical slices of the data at positions $X_1$ and $X_2$ are shown in FIGS. 1C and 1D, respectively. These vertical slices of data relate to the parameter being estimated at their respective spatial location. As can be seen in FIGS. 1C and 1D, decreasing the spacing between the optical wavelengths $\lambda_1$ through $\lambda_N$ will result in higher resolution of the signals used to estimate the parameter of interest. The spacing between the optical wavelengths $\lambda_1$ through $\lambda_N$ can be constant or varied. For example, the spacing can be decreased so that the resolution at a desired location along the optical fiber can be increased. The spacing can be controlled automatically or manually. In some applications, it may be desirable to do a coarse resolution scan, and then follow-up with a finer resolution scan if, for some example, some aspect of the measurement is perceived to have changed. In one embodiment, the optical wavelength of the light inputs is varied continuously although more slowly than the change in frequency of the swept-amplitude modulation.

Reference may now be had to FIG. 2. FIG. 1 illustrates a simplified schematic diagram of an optical sensing system 10. The optical system 10 includes an optical interrogator 11 in optical communication with an optical fiber 12. The optical fiber 12 is shown affixed to a casing 4 that is disposed in a borehole 2 penetrating the earth 3. The casing 4 represents any equipment, apparatus, or material that the optical fiber 12 may be used by itself or in conjunction with an optical measurement device 13 on which to perform measurements. Non-limiting embodiments of the type of measurements include pressure, temperature, strain, force, acceleration, and shape. The optical interrogator 11 is configured to transmit light inputs 5 into the optical fiber 12 and to receive reflected light 6, which is more generally referred to as the resultant light signals 6.

Still referring to FIG. 2, a computer processing system 14 is coupled to the optical interrogator 11. The computer processing system 14 is configured to process the reflected light 6 associated each light input 5 having a unique wavelength to provide the multiple sets of readings. For example, the computer processing system 14 can perform the FFT on each set of reflected light 6 received. The computer processing system 14 can be standalone or incorporated into the optical interrogator 11.

The optical interrogator 11 can be configured as one unit or as multiple units. For example, in one embodiment, the optical interrogator 11 can be configured as one unit that includes a light source and a photodetector. The optical interrogator in this configuration can transmit light into and receive light from a same end of the optical fiber 12. In another embodiment, the optical interrogator can be configured as two units where a first unit includes a light source configured to transmit light into the optical fiber 12 at a first end and a second unit includes a photodetector configured to receive the resultant light signals 6 from a second end of the optical fiber 12 (i.e., the end opposite from which the transmitted light was input).

Figure 3:
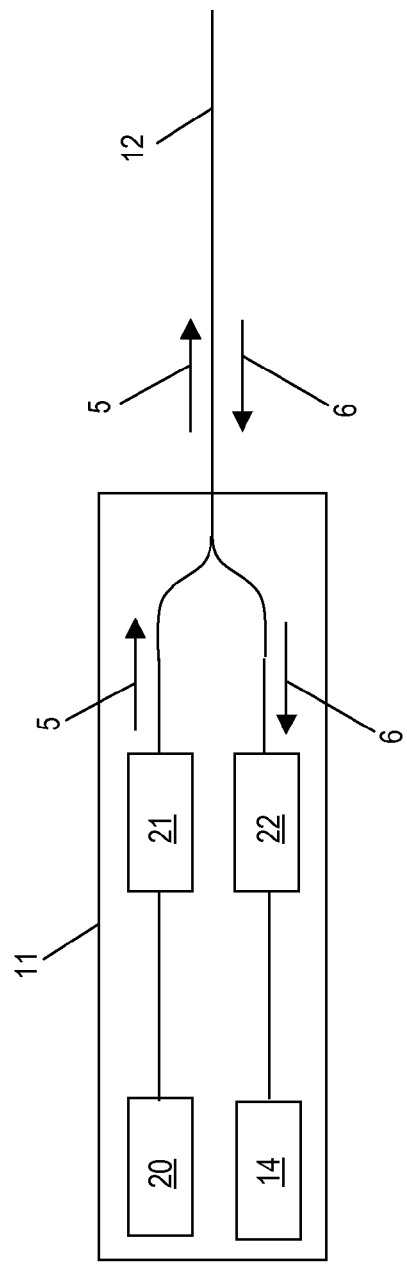
FIG. 3 depicts aspects of an optical interrogator.

Reference may now be had to FIG. 3. FIG. 3 depicts aspects of the optical interrogator 11. The optical interrogator 11 includes a wavelength (or frequency) tunable light source 20 configured to generate a continuous wave of the input light 5 having a substantially constant first frequency. To modulate the light input 5, the optical interrogator 11 includes a modulator 21 in optical communication with the tunable light source 20. The light input 5 is modulated (generally as a sine wave) at a first modulation frequency. The frequency of modulation is then swept by the modulator 21 to a second modulation frequency or other frequencies, generally in a step-wise change, although, other types of changes or sweeping, such as linear sweeping, can be used. In general, the modulation frequencies are in the radio frequency range, although, other frequencies can be used down to zero Hertz. The reflected light 6 is received from the optical fiber 12 resulting from the change in the frequency of modulation. Because of the modulated continuous wave of light input 5, the reflected light 6 can be considered to be in the frequency domain. The optical interrogator 11 can have one light source 20 that is tunable to provide more than one optical wavelength of light input 5 or multiple light sources 20 each configured to provide one or more optical wavelengths of the light input 5.

Still referring to FIG. 3, the reflected light 6 is detected by a light detector 22 and then inversely transformed by the computer processing system 14 using an FFT into the time domain. Recognizing that time can be correlated to a spatial location by way of time of flight, reflections can then be correlated to a spatial location along the optical fiber 12 to produce a first set of measurements. As discussed above, the first set of measurements may not include reflections from all of the optical components in communication with the optical fiber 12 due to limitations in the frequency domain associated with the swept modulation of the continuous wave of the light input 5.

A second set of measurements is then performed by the optical interrogator 11 to obtain more measurements of the optical component(s) 13. For the second set of measurements, the tunable light source 20 emits a continuous wave of the light input 5 at a substantially constant second frequency. The input light 5 at the constant second frequency is then modulated at a swept frequency by the modulator 21. In one embodiment, the swept frequency modulation used for the second set of measurements is the same as the swept frequency modulation used for the first set of measurements, however, other modulation can be used to obtain other interrogation characteristics.

Multiple sets of readings are obtained as the tunable light source 20 is configured to emit a series of the light inputs 5 into the optical fiber 12 with each light input 5 having a unique wavelength. To complement the tunable light source 20, the light detector 22 is configured to receive the reflected light 6 associated with each unique frequency of the light input 5. The computer processing system 14 is configured to combine the multiple sets of readings into a composite set of readings that provides a desired resolution and dynamic range of the readings of the optical components (13).

Included but not shown for simplicity in the optical interrogator 11 in FIG. 3 are various optical devices known in the art such as a spectrum analyzer, beam splitter, light circulator, gain meter, phase meter, lens, filter and fiber optic coupler for example.

Figure 4:
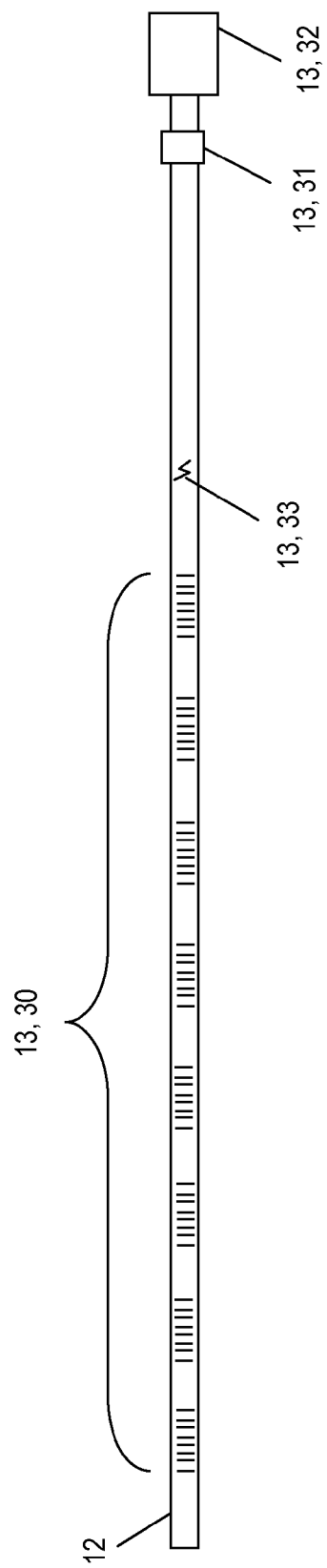
FIG. 4 depicts aspects of components in communication with the optical fiber and configured for estimating a parameter.

Reference may now be had to FIG. 4. FIG. 4 depicts aspects of various optical components 13 in communication with the optical fiber 12. Exemplary embodiments of the optical components 13 include distributed FBGs 30, an optical connector (or splice) 31, an individual sensor 32, and a defect 33.

Figure 5:
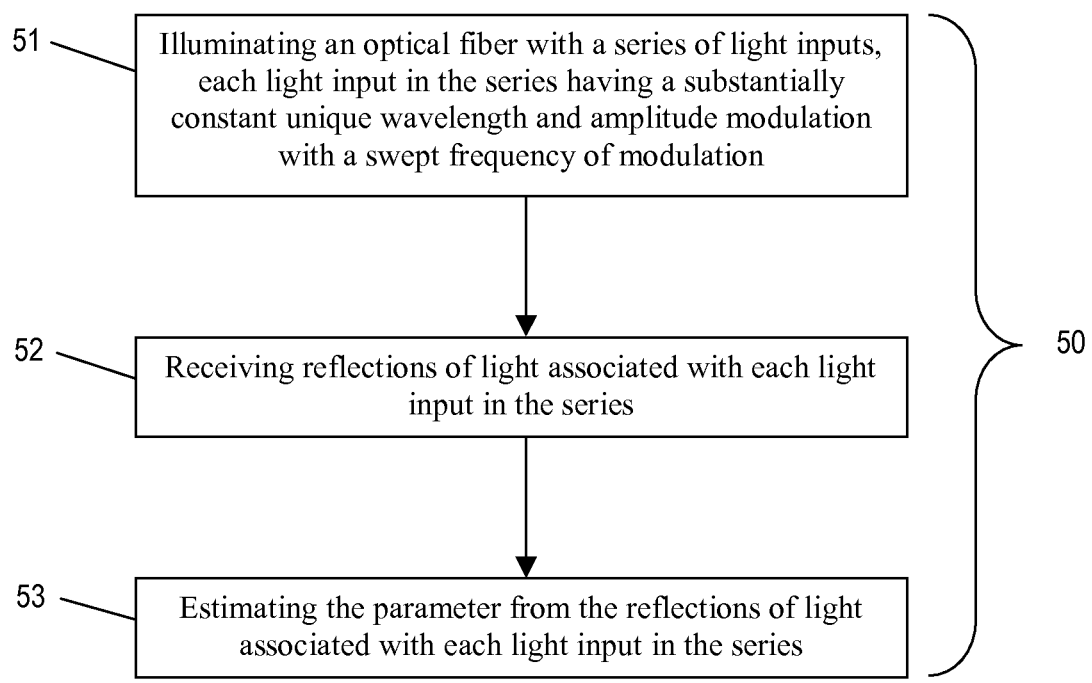
FIG. 5 presents one example of a method for estimating a parameter.

FIG. 5 presents one example of a method 40 for estimating a parameter. The method 50 calls for (step 51) illuminating the optical fiber 12 with a series of the light inputs 5, each light input 5 in the series having a substantially constant unique wavelength and amplitude modulation with a swept frequency of modulation. Further, the method 50 calls for (step 52) receiving the light reflections 6 associated with each light input 5 in the series. Further, the method 50 calls for (step 53) estimating the parameter from the light reflections 6 associated with each light input 5 in the series.

The optical sensing system 10 provides several advantages over prior art sensing systems. One advantage is that a user can select a resolution to be used to obtain readings of the optical component(s) 13. The readings can be obtained over hundreds of meters or more in the optical fiber 12. Another advantage is that components 13 with a wide dynamic sensing range can be read. Yet, another advantage is the optical sensing system 10 is relatively immune to vibration of the optical fiber 12 because the wavelength of the light input 5 is held substantially constant while the associated reflected light 6 is received and processed. Still another advantage is the optical sensing system 10 is immune to nonlinearities related to sweeping the wavelength of input light in prior art sensing systems also because the wavelength of the light input 5 is held substantially constant while the associated reflected light 6 is received and processed.

The speed of the optical sensing system 10 can be improved by performing measurements with two light inputs 5 simultaneously (i.e., in parallel). When performing measurements in parallel, one light source 20 may be used that can emit light of two or more different wavelengths simultaneously. Alternatively, more than one light source 20 can be used where each light source 20 can emit light with a fixed wavelength. In addition, any combination of light sources 20 having fixed wavelength emission or multiple wavelength emission can also be used.

In support of the teachings herein, various analysis components may be used, including a digital and/or an analog system. For example, the optical interrogator 11 or the computer processing system 14 can include the digital and/or optical system. The system may have components such as a processor, storage media, memory, input, output, communications link, user interfaces, software programs, signal processors (digital or analog) and other such components (such as resistors, capacitors, inductors and others) to provide for operation and analyses of the apparatus and methods disclosed herein in any of several manners well appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling unit, heating unit, motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second, "third," etc. are used to distinguish elements and are not used to denote a particular order.

It will be recognized that the various components or technologies may provide certain necessary or beneficial functionality or features. Accordingly, these functions and features as may be needed in support of the appended claims and variations thereof are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for obtaining a parameter of interest, the apparatus comprising:
   an optical fiber;
   an optical component that provides the parameter of interest, the optical component being in communication with the optical fiber and configured to interact with light at a wavelength related to the parameter of interest; and
   an optical interrogator in communication with the optical fiber and configured to:
      illuminate the optical fiber with a series of light inputs, each light input in the series having a substantially constant unique optical wavelength and swept-frequency amplitude modulation; and
      receive a resulting light signal associated with each light input in the series;
   wherein the resulting light signals associated with the series of light inputs are used to obtain the parameter of interest.

2. The apparatus of claim 1, wherein a constant difference separates adjacent unique wavelengths for the light inputs in the series.

3. The apparatus of claim 2, wherein the constant difference is selected to achieve a selected resolution of the parameter.

4. The apparatus of claim 1, wherein the light inputs comprise a range of wavelengths selected to achieve a selected dynamic range of the parameter.

5. The apparatus of claim 1, wherein the swept-frequency amplitude modulation of each light input in the series is the same.

6. The apparatus of claim 1, wherein the swept-frequency amplitude modulation is performed at frequencies in a range of radio frequencies.

7. The apparatus of claim 1, wherein the swept-frequency amplitude modulation comprises a step-wise change in frequency.

8. The apparatus of claim 1, wherein the optical interrogator comprises a tunable light source configured to provide the series of light inputs.

9. The apparatus of claim 8, wherein the optical interrogator further comprises a modulator configured to modulate the amplitude of each light input in the series with a swept frequency.

10. The apparatus of claim 1, wherein the parameter of interest comprises at least one of pressure, temperature, strain, force, acceleration, shape, and an optical response of the optical fiber.

11. The apparatus of claim 1, wherein the optical component comprises at least one of a fiber Bragg grating (FBG), a plurality of distributed FBGs, an optical fiber connector, a defect in the optical fiber, and at least one segment of the optical fiber.

12. The apparatus of claim 1, further comprising a processor configured to transform the resultant light signal associated with each light input in the series from an optical frequency domain into a spatial frequency domain to provide a measurement set corresponding to each light input in the series.

13. The apparatus of claim 12, wherein the processor is further configured to correlate each resultant light signal in each measurement set to a spatial location along the optical fiber.

14. The apparatus of claim 13, wherein the processor is further configured to assemble the measurement sets into a composite measurement set comprising a magnitude and spatial location for each resultant light signal received from the optical fiber.

15. The apparatus of claim 1, wherein the optical fiber is configured to be disposed in a borehole penetrating the earth.

16. A method for obtaining a parameter of interest, the method comprising:
    illuminating an optical fiber with a series of light inputs using an optical interrogator, each light input in the series having a substantially constant unique wavelength and swept-frequency amplitude modulation;
    receiving a resulting light signal associated with each light input in the series using the optical interrogator;
    obtaining the parameter of interest from the resulting light signals associated with the series of light inputs;
    wherein an optical component that provides the parameter of interest is in communication with the optical fiber and configured to interact with light at a wavelength related to the parameter of interest.

17. The method of claim 16, further comprising transforming the resulting light signals associated with the series of light inputs from a frequency domain into a spatial frequency domain to provide a measurement set corresponding to each light input in the series.

18. The method of claim 17, wherein a Fast Fourier Transform is used to perform the transforming.

19. The method of claim 17, further comprising correlating each resulting light signal in each measurement set to a spatial location along the optical fiber and assembling the measurement sets into a composite measurement set comprising a magnitude and spatial location for each reflection received from the optical fiber.

20. The method of claim 16, wherein the light inputs are input into and received from a same end of the optical fiber.

21. The method of claim 16, wherein the light inputs are input into the optical fiber at a first end of the optical fiber and the resultant light signals are received form a second end of the optical fiber.

22. A non-transitory computer-readable medium comprising computer-executable instructions for obtaining a parameter of interest by implementing a method comprising:
    illuminating an optical fiber with a series of light inputs, each light input in the series having a substantially constant unique wavelength and swept-frequency amplitude modulation, wherein the optical fiber is in communication with an optical component configured to interact with light at a wavelength related to the parameter of interest;
    receiving a resultant light signal associated with each light input in the series; and
    obtaining the parameter from the resultant light signals associated with the series of light inputs.

* * * * *